(12) United States Patent
Tarakçi et al.

(10) Patent No.: US 12,305,719 B2
(45) Date of Patent: May 20, 2025

(54) CIRCUIT CARRIER FOR CARDAN SHAFTS

(71) Applicant: TIRSAN KARDAN SANAYI VE TICARET ANONIM SIRKETI, Manisa (TR)

(72) Inventors: Sedat Tarakçi, Manisa (TR); Oguzhan Aldemir, Manisa (TR); Efe Isik, Manisa (TR)

( * ) Notice: Subject to any disclaimer, the term of this patent is extended or adjusted under 35 U.S.C. 154(b) by 406 days.

(21) Appl. No.: 17/996,041

(22) PCT Filed: Dec. 22, 2021

(86) PCT No.: PCT/TR2021/051459
§ 371 (c)(1),
(2) Date: Oct. 12, 2022

(87) PCT Pub. No.: WO2022/139765
PCT Pub. Date: Jun. 30, 2022

(65) Prior Publication Data
US 2023/0204079 A1   Jun. 29, 2023

(30) Foreign Application Priority Data
Dec. 24, 2020   (TR) .................................. 2020/21618

(51) Int. Cl.
*F16D 3/38* (2006.01)
(52) U.S. Cl.
CPC ...... *F16D 3/387* (2013.01); *F16D 2250/0046* (2013.01); *F16D 2300/18* (2013.01)

(58) Field of Classification Search
CPC ....... B60Y 2400/303; B60Y 2400/3032; F16C 41/007; F16C 2233/00; F16D 3/38;
(Continued)

(56) References Cited

U.S. PATENT DOCUMENTS 3,716,788 A * 2/1973 Nishida ................ F16C 41/007
310/155
3,812,391 A   5/1974 Johnson et al.
(Continued)

FOREIGN PATENT DOCUMENTS

DE   3928972 A1   3/1991
DE   4237870 A1   3/1994
(Continued)

OTHER PUBLICATIONS

International Search Report for corresponding PCT/TR2021/051459. dated Jun. 10, 2022.
(Continued)

*Primary Examiner* — Josh Skroupa
(74) *Attorney, Agent, or Firm* — Egbert, McDaniel & Swartz, PLLC

(57) ABSTRACT

A circuit carrier for positioning a circuit on a rotating part of the cardan shaft has a carrier body engaging the rotating part, a circuit assembly surface affixed to the carrier body, an elevation foot projecting axially from the circuit assembly surface, a circuit member affixed to the elevation foot, a channel formed on the circuit assembly surface, a retaining hole formed on the circuit assembly surface, and a coating encapsulating the circuit member and at least partially filling the channel. The coating completely fills the retaining hole.

10 Claims, 5 Drawing Sheets

(58) Field of Classification Search
CPC .......... F16D 3/382; F16D 3/385; F16D 3/387; F16D 3/40; F16D 3/405; F16D 3/41; F16D 3/42; F16D 3/43; F16D 2250/0046; F16D 2300/18; F16D 2300/20; G01P 3/44; G01P 3/43; Y10S 464/905
USPC ................. 464/23, 112–136, 905; 73/115.05
See application file for complete search history.

(56) References Cited

U.S. PATENT DOCUMENTS

| | | | | |
|---|---|---|---|---|
| 5,046,867 | A | * | 9/1991 | Hilby .................... F16C 41/007 324/207.2 |
| 5,123,755 | A | * | 6/1992 | Faye ..................... F16C 41/007 310/168 |
| 5,223,760 | A | * | 6/1993 | Peck ...................... G01P 3/443 310/68 B |
| 6,821,021 | B2 | * | 11/2004 | Message ............... F16C 41/007 324/173 |
| 9,739,672 | B2 | * | 8/2017 | Itomi .................... F16C 41/007 |
| 11,630,118 | B2 | * | 4/2023 | Tarakçi .................. F16D 3/387 73/115.05 |

FOREIGN PATENT DOCUMENTS

| | | | |
|---|---|---|---|
| EP | 0442121 A2 | * 8/1991 | ............. G01P 3/443 |
| EP | 3714178 A2 | 9/2020 | |
| GB | 1566006 A | 4/1980 | |
| TR | 2017/08500 | 8/2017 | |
| WO | 2012146544 A1 | 11/2012 | |

OTHER PUBLICATIONS

Written Opinion of the International Searching Authority for corresponding PCT/TR2021/051459. dated Jun. 10, 2022.

* cited by examiner

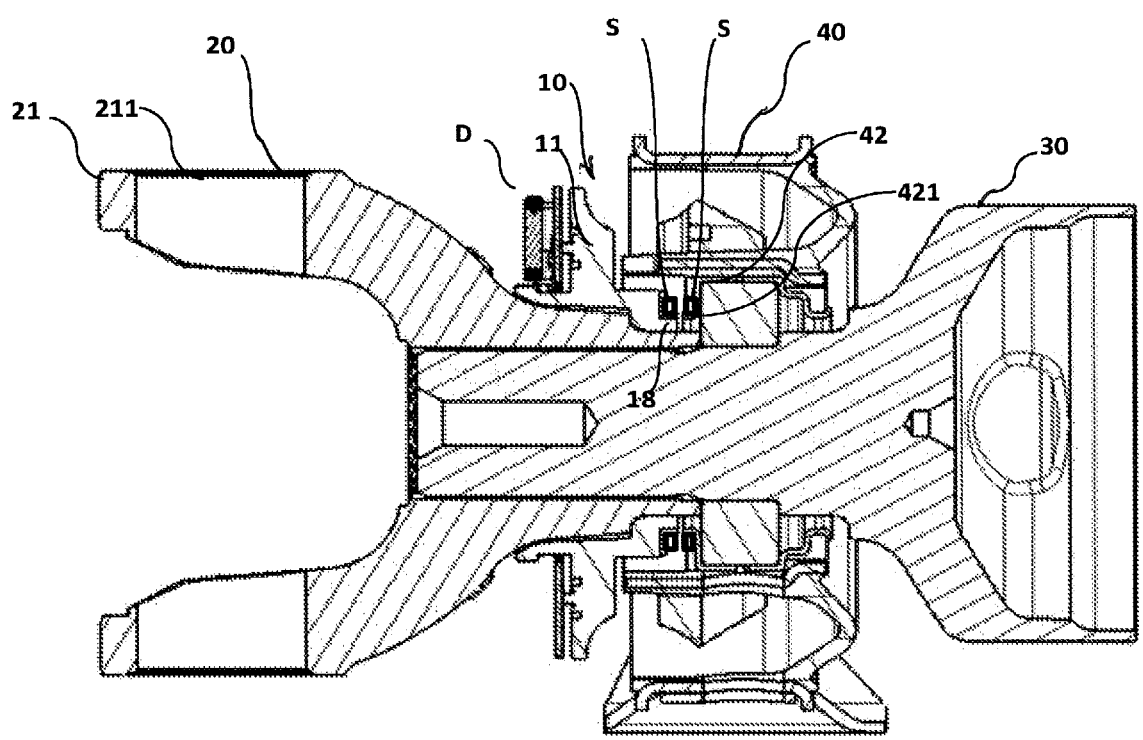
FIGURE 1.A

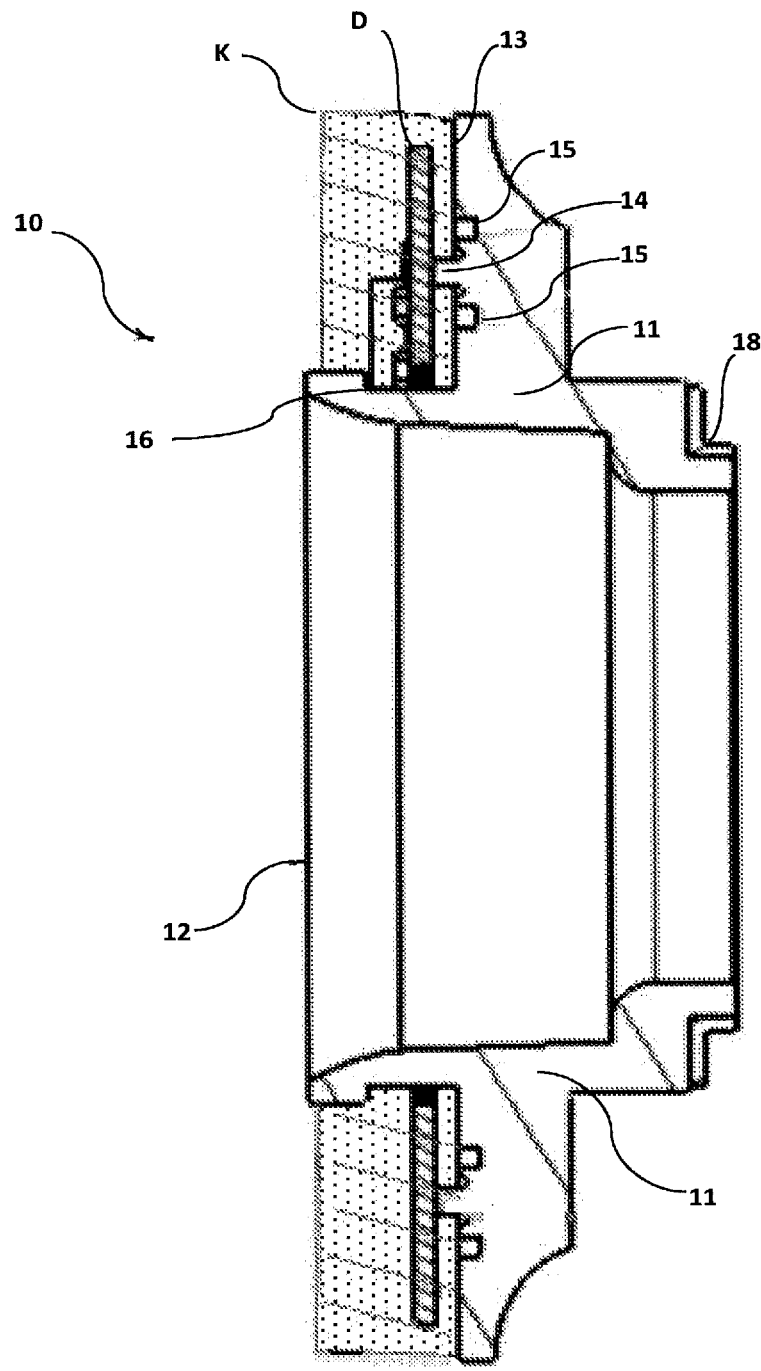
FIGURE 2.A

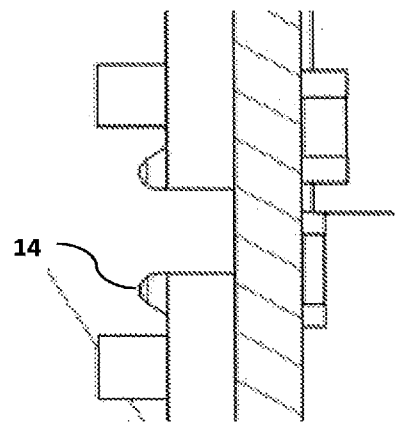
FIGURE 2.B
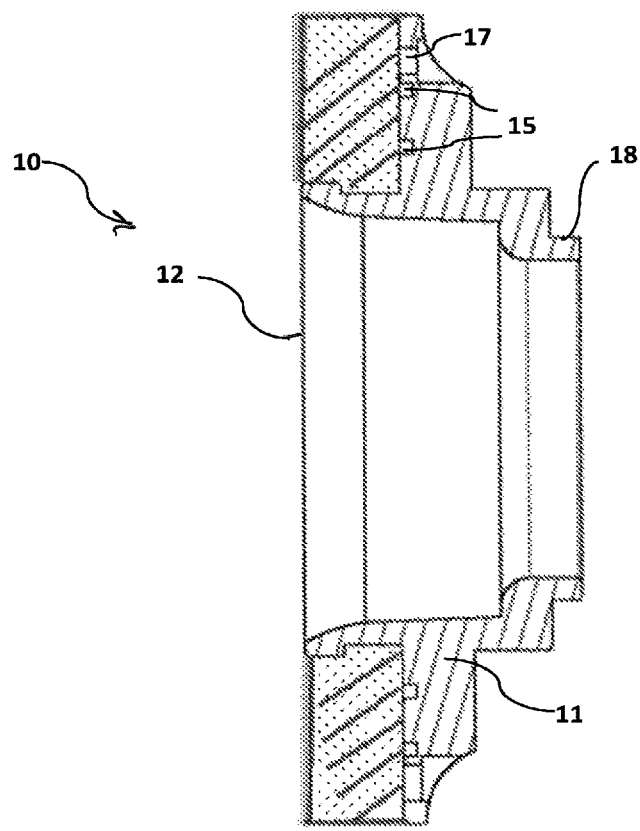
FIGURE 2.C

CIRCUIT CARRIER FOR CARDAN SHAFTS

FIELD OF THE INVENTION

The present invention relates to a circuit carrier element that provides positioning and protection of an electronic circuit on the rotating elements of the cardan shafts, a cardan shaft with said circuit carrier element and the production method of said circuit carrier element.

PRIOR ART

Drive shafts are transmission elements used in moving a vehicle by receiving the rotational movement and power generated in the engine in motor vehicles from the engine or gearbox and transmitting the same to the differential of the vehicle.

It is not possible to provide various measurements over the shaft considering the positioning of the cardan shafts on the vehicle and therefore cardan shaft designs are made according to the predictions or simulations provided according to the conditions and environment in which the vehicle will be used. However, said methods are not sufficient to reflect the field conditions completely. Besides, such measurements cannot be provided while the vehicle is currently in use. One of the basic reasons for this is the difficulties in connecting sensors or measurement devices on the shaft and in feeding these devices.

A wireless power transmission system is disclosed in application numbered TR2017/08500. Herein, the coil windings positioned on the coil carriers, one on the cardan shaft and the other on the center bearing carrying the cardan shaft, provide power transfer to each other. An electronic circuit arranged on the shaft is fed with the wireless power transfer provided here. However, the circuit has contact with dust, liquid and similar damaging agents depending on the ambient conditions under operating conditions and therefore its operating life is very limited.

In various studies, coating studies for the protection of electronic circuits from ambient conditions on various elements of motor vehicles have been described.

The document with the publication number WO2012146544A1 mainly relates to a study for applying a protective coating to the electronic components to be used in vehicle drive gears. The basis of the study carried out here is that the circuit coating contains ceramic nanoparticles and oil/water repellent substances. Such type of coating is far from meeting the mechanical needs especially for the cardan shafts, independent of the coating content. The circuit is provided on a surface extending in the radial direction on a rotating element in cardan shafts. The coatings provided here often do not stay in the assembly position at high speed and do not provide complete sealing. Besides, it has been seen that it is not possible to encapsulate the circuit completely with such coatings.

It has been recommended to first place the circuit in a foam chamber and to cover said chamber with a covering material so as to protect the electronic circuits on the vehicle in another document with publication number DE4237870A1. It does not seem possible to use a freely provided electronic circuit in a certain volume on a structure, such as a cardan shaft, that is constantly exposed to impact vibrations under road conditions.

As a result, all abovementioned problems have made it necessary to make an improvement in the relevant technical field.

AIM OF THE INVENTION

The present invention aims to eliminate the abovementioned problems and to make a development in the relevant technical field.

The main aim of the invention is to reveal the structure of a circuit carrier containing a coating for the protection and assembly of electronic parts on the rotating elements of the cardan shaft, and a cardan shaft with said circuit carrier and the production method for said circuit carrier.

BRIEF DESCRIPTION OF THE INVENTION

The present invention relates to a circuit carrier for positioning a circuit on a rotating part of the cardan shaft so as to fulfill all aims mentioned above and will be obtained from the following detailed description. Accordingly, the present invention comprises the following; a carrier body that includes an opening arranged to allow the rotating parts of the cardan shaft to pass through and is provided such that it engages the rotating part of the cardan shaft; circuit assembly surface that is provided on said carrier body as a radially extending surface; at least one elevation foot provided as an axially extending projection on said circuit assembly surface; a circuit member provided on the elevation foot such that it does not contact the circuit assembly surface; at least one channel provided on the circuit assembly surface; at least one retaining hole provided on the circuit assembly surface; a coating provided to completely encapsulate said circuit element and to at least partially fill the recess and completely fill the retaining hole.

Therefore, said coating is provided in such a way that it does not come off said circuit carrier by means of the recess and the retaining holes and also the sealing of all surfaces has been increased by means of the elevation feet and the channel. Accordingly, the solution was achieved by the arrangements provided on the circuit assembly surface rather than the type and content of the coating.

In a preferred embodiment of the invention, said circuit assembly surface is provided in a circular shape.

In a preferred embodiment of the invention, said channel is provided in the form of a ring around the opening.

A preferred embodiment of the invention comprises two channels at the lower and upper part of said circuit element.

In a preferred embodiment of the invention, the tip of said elevation feet is provided with radius.

A preferred embodiment of the invention comprises a recess on the carrier body surface extending towards the rotating part.

A preferred embodiment of the invention comprises a coil winding surface to allow a coil winding to be wound onto the carrier body, which will provide wireless power transfer with another coil winding.

In order to achieve all the aims mentioned above and which will emerge from the detailed explanation below, the present invention is a cardan shaft comprising the following; at least one midship yoke member and the cardan shaft unit element associated with said midship yoke piece; a center bearing to carry the cardan shaft and a circuit carrier in accordance with any of the embodiments that will emerge from claims 1-6 or the detailed description provided in connection with the neck portion of said intermediate yoke part or cardan shaft unit element.

In order to achieve all the aims mentioned above and which will emerge from the detailed explanation below, the present invention is a cardan shaft comprising the following; at least one midship yoke member and the cardan shaft unit element associated with said midship yoke piece; a center bearing to carry the cardan shaft and a circuit carrier in accordance with any of the embodiments of the coil winding surface that will emerge from claim 6 or the detailed description provided in connection with the neck portion of said intermediate yoke part or cardan shaft unit element; two coil windings, one positioned on the center bearing and the other positioned on the circuit carrier, to provide wireless power transfer between each other.

The present invention relates to the production method of a circuit carrier for positioning a circuit on a rotating part of the cardan shaft so as to fulfill all aims mentioned above and will be obtained from the following detailed description. Accordingly, the present invention comprises the following process steps; providing a circuit carrier according to any of claims 1-6, applying the fluid coating on the circuit assembly surface such that the circuit element is completely encapsulated and fills the recess at least partially and completely the retention hole and then left to dry or to be dried.

BRIEF DESCRIPTION OF DRAWINGS

In FIG. 1A, a section view of the structure in FIG. 1 is given.

In FIG. 2.A, a cross-sectional view of an embodiment of the circuit carrier whose electronic circuit is coated is given.

In FIG. 2.B, a detailed view of an embodiment of the elevation feet of the circuit carrier is given In FIG. 2.C, a cross-sectional view of a circuit carrier structure with retaining holes is given.

The figures are not required to be scaled and the details which are not necessary for understanding the present invention may be neglected. Moreover, the elements that are at least substantially identical or have at least substantially identical functions are shown by the same number.

DESCRIPTION OF THE REFERENCES IN FIGURES

Figure 1:
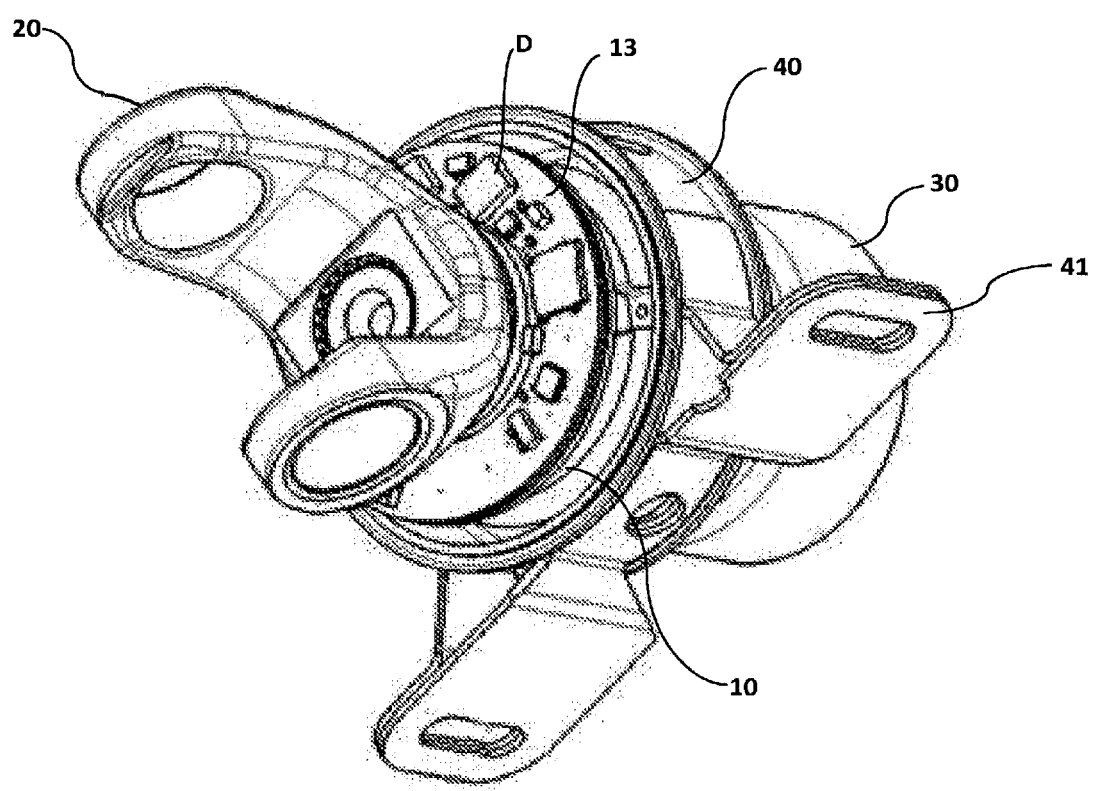
In FIG. 1, an isometric view of the partial state of a cardan shaft structure with an electronic circuit provided on a center bearing is given.

10. Circuit carrier
11. Carrier body
12. Opening
13. Circuit assembly surface
14. Elevation feet
15. Filling channels
16. Recess
17. Retaining holes
18. Coil winding surface
20. Midship yoke
21. Yoke
211. Yoke Hole
30. Cardan shaft unit element
40. Center bearing
41. Center bearing connection
42. Fixed coil carrier
421. Secondary winding surface
D. Circuit element
S. Winding
K. Coating

DETAILED DESCRIPTION OF THE INVENTION

In this detailed description, the inventive circuit carrier for cardan shafts (10) is described by means of examples only for clarifying the subject matter such that no limiting effect is created.

The present invention relates to a circuit carrier (10) element that provides positioning and protection of an electronic circuit on the rotating elements of the cardan shafts, a cardan shaft with said circuit carrier (10) element and the production method of said circuit carrier (10) element.

The present invention relates to a circuit carrier (10) for positioning a circuit on a rotating part of the cardan shaft, characterized in that, it comprises the following; a carrier body (11) that includes an opening (12) arranged to allow the rotating parts of the cardan shaft to pass through and is provided such that it engages the rotating part of the cardan shaft;

circuit assembly surface (13) that is provided on said carrier body (11) as a radially extending surface;

at least one elevation foot (14) provided as an axially extending projection on said circuit assembly surface (13);

a circuit member (D) provided on the elevation foot (14) such that it does not contact the circuit assembly surface (13);

at least one channel (15) provided on the circuit assembly surface (13);

at least one retaining hole (17) provided on the circuit assembly surface (13);

a coating (K) provided to completely encapsulate said circuit element (D) and at least partially fill the channel (15) and completely fill the retaining hole (17).

Here, the circuit element (D) may be a single part of a larger component, or it may be the component itself. The circuit element (D) can be measurement elements or sensors that can take measurements especially on the relevant elements of the cardan shaft.

Said coating (K) is a structure that takes its protective final form by drying after it is applied in fluid form on the circuit carrier (10), in particular on the circuit element (D). Applying the coating (K) to the circuit element (D) before it is connected to the circuit carrier (10) will prevent most of the technical benefits of the invention.

Referring to FIGS. 1 and 1.A; Said circuit carrier (10) is arranged to be connected on a carrier body (11) and especially on a rotating element of the cardan shaft. Here, preferably the carrier body (11) is arranged to surround said rotating element in the form of a sheath.

Besides, the circuit carrier (10) comprises a circuit assembly surface (13) to which the circuit element (D) is connected and extending from the carrier body (11) in the radial direction and preferably arranged in a planar manner.

Besides, there is an opening (12) on the carrier body (11), through which the rotating element of the cardan shaft can pass.

In a preferred embodiment of the invention, the rotating part of the cardan shaft is chosen as a midship yoke (20). Here, the circuit carrier (10) is arranged to be connected to the midship yoke (20), in particular to the neck portion of a midship yoke (20). Here, midship yoke (20) includes a pair of yokes (21) for inserting the trunnions of a cross and an yoke hole (211) on the yokes (21).

A cardan shaft unit element (30), in particular an intermediate bearing shaft, is placed inside said midship yoke (20). Here, the midship yoke (20) and the cardan shaft unit element (30) are connected with each other by means of splines extending in the axial direction.

The midship yoke (20) and the cardan shaft unit element (30) are carried with the help of a center bearing (40) and are connected to the vehicle chassis with a center bearing connection (41). In a specific embodiment, the center bearing (40) contains fixed coil carrier (42) and a secondary winding surface (421) arranged on the fixed coil carrier (42). A coil winding (S) is arranged on said secondary winding surface (421).

There is a coil winding surface (18) on the circuit carrier (10) and a coil winding (S) provided on this surface in response to the coil winding (S) on the secondary winding surface (421). These two coil windings (S) are arranged to provide wireless power transfer between each other. Therefore, the circuit element (D) can be powered on the circuit carrier (10). The circuit element (D) may also be powered by different wireless power transfer arrangements or by battery-like power sources provided on the circuit carrier (10).

Figure 2:
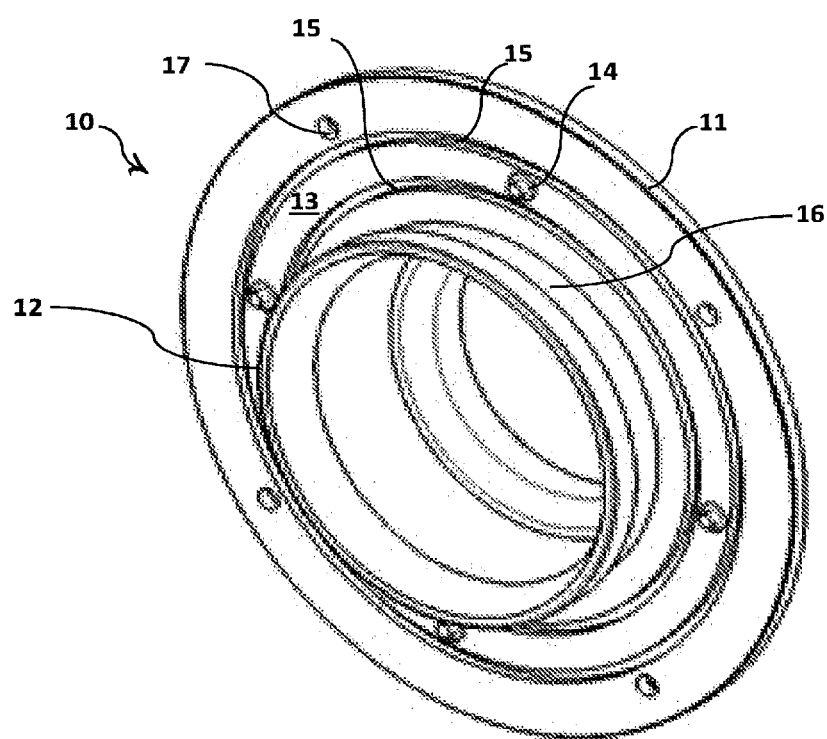
In FIG. 2, an isometric view of the circuit carrier without the electronic circuit and the coating is given.

The circuit carrier (10) contains a circular carrier body (11) and an opening (12) is provided in the center of said carrier body (11) such that it functions as a mouth with reference to FIGS. 2 and 2.A. The opening (12) is at the end of the walls extending in the axial direction on the carrier body (11). There is a circuit assembly surface (13) extending planar in the radial direction from the surface of the carrier body (11). The circuit assembly surface (13) is provided specifically planar for mounting the circuit elements (D).

There is preferably at least one elevation foot (14) on said circuit assembly surface (13) in the form of a protrusion, on which the circuit element (D) is placed and which prevents the circuit element (D) from directly contacting the circuit assembly surface (13). Herein, the elevation foot (14) allows the circuit element (D) to be fully encapsulated, as will be explained later.

The fluid coating (K) cannot reach the bottom of the circuit element (D) under normal conditions, which creates problems in terms of sealing. The elevation feet (14) creates a gap between two elements by breaking the contact of the circuit element (D) with the circuit assembly surface (13), and the coating (K) fills said cavity, ensuring that the circuit element (D) is completely encapsulated.

As can be clearly understood here, the expression to fully encapsulate refers to the surfaces of the circuit element (D) outside the part where the elevation feet (14) and the circuit element (D) come into contact.

A plurality of elevation feet (14) can preferably be provided and in particular, it can be arranged on the circuit assembly surface (13) with equal angle intervals.

The end portion of the elevation feet (14) that contacts the circuit element (14) is preferably provided with a radius as shown in FIG. 2.B and accordingly, the amount of surface covered in the circuit element (D) is increased by minimizing the contact area therein.

At least one, preferably two, channels (15) are arranged on the circuit assembly surface (13) so as to increase the sealing and to ensure that the coating (K) is connected to the surface more tightly. Here, the channels (15) are preferably arranged in the form of a ring. Passage of fluid through the part related to the filling of the coating (K) into these channels (15) is prevented or significantly reduced compared to the planar surfaces.

In a preferred embodiment, two channels (15) are arranged and the elevation foot (14) is provided to be positioned between said channels (15). Therefore, the channels (15) ensure sealing especially in the area where the elevating foot (14), that is, the circuit element (D), is located.

A recess (16) is provided on said carrier body (11) with reference to FIG. 2.A. The recess (16) is preferably provided on the axial walls where the opening (12) is provided. The recess (16) is especially provided in the form of a recess extending in the radial direction towards the rotating part of the cardan shaft. The coating (K) fills the recess (16) in a fluid state and after drying, the recess (16) prevents the coating (K) from moving in the axial direction. Besides, it also increases the sealing similar to the channels (15).

There are also retaining holes (17) arranged on the circuit assembly surface (13). Said retaining holes (17) preferably extend in the axial direction on the circuit assembly surface (13). Retaining holes (17) can also be provided in a channel structure opening to the rear section of the circuit assembly surface (13), as in FIG. 2.C. The fluid coating (K) fills the retaining holes (17), forming an integrated pin with itself and it prevents the movement of the coating (K) on the circuit assembly surface (13) after freezing Retaining holes (17) are preferably provided in the outer diameter portion of the circuit assembly surface (13). Retaining holes (17) are provided especially between the outer diameter and the channel (15), if any, of the channel (15) closest to the outer diameter.

The production of said circuit carrier (10) is as follows.

A circuit carrier (10) is provided in accordance with any of the above descriptions or claims. A fluid coating (K) is applied on the circuit assembly surface (13). Here, the fluid coating is filled into the lower part of the circuit element (D), whose contact with the circuit assembly surface (13) is cut off by the elevating feet (14), the holder holes (17) and the channels (15), preferably at least a part or all of the recess. Then the fluid coating (K) takes its final form by being dried or drying. Preferably, the opening (12) axis of the circuit holder (10) is positioned perpendicular to the floor during application.

It is also possible to apply a mold in the form of a cover on the circuit mounting surface (13) so as to give a specific shape to the coating during the application of said fluid.

The coating (K) is preferably a thermoplastic. In one embodiment, in particular, thermoplastic polyamide is used.

The protection scope of the invention is specified in the appended claims and cannot be limited to the description made for illustrative purposes in this detailed description. Likewise, it is clear that a person skilled in the art can present similar embodiments in the light of the above descriptions without departing from the main theme of the invention.

The invention claimed is:

1. A circuit carrier for positioning a circuit on a rotating part of the cardan shaft, the circuit carrier comprising:
    a carrier body having an opening, the opening adapted to allow the cardan shaft to pass therethrough, said carrier body adapted to engage with a rotating portion of the cardan shaft;
    a circuit assembly surface affixed to said carrier body and extending radially outwardly therefrom;
    at least one elevation foot projecting axially from said circuit assembly surface;
    a circuit member affixed to said at least one elevation foot so as to not contact said circuit assembly surface;
    at least one channel formed on said circuit assembly surface;
    at least one retaining hole formed on said circuit assembly surface; and a coating encapsulating said circuit member and at least partially filling said at least one channel and completely filling said at least one retaining hole.

2. The circuit carrier of claim 1, wherein said circuit assembly surface has a circular shape.

3. The circuit carrier of claim 1, said at least one channel is a ring that extends around the opening of said carrier body.

4. The circuit carrier of claim 1, wherein said at least one channel comprises a pair of channels positioned respectively at a top portion and a bottom portion of said circuit members.

5. The circuit carrier of claim 1, wherein said at least one elevation foot has a radius.

6. The circuit carrier of claim 1, further comprising:
a recess formed on a surface of said carrier body, said recess extending toward the rotating part of the cardan shaft.

7. The circuit carrier of claim 1, further comprising:
a coil winding surface adapted to allow a coil winding to be wound onto said carrier body so as to provide a wireless power transfer to another coil winding.

8. A circuit carrier assembly comprising:
a cardan shaft having at least one midship yoke and a cardan shaft unit element connected to said at least one midship yoke, said cardan shaft having a center bearing carrying said cardan shaft;
a carrier body having an opening, said cardan shaft extending through the opening, said carrier body engaging a rotating portion of said cardan shaft, said carrier body affixed to a neck portion of the at least one midship yoke or to the cardan shaft unit element;
a circuit assembly surface affixed to said carrier body and extending radially outwardly therefrom;
at least one elevation foot projecting axially from said circuit assembly surface;
a circuit member affixed to said at least one elevation foot so as to not contact said circuit assembly surface;
at least one channel formed on said circuit assembly surface;
at least one retaining hole formed on said circuit assembly surface; and
a coating encapsulating said circuit member and at least partially filling said at least one channel and completely filling said at least one retaining hole.

9. The circuit carrier assembly of claim 8, further comprising:
a first coil winding positioned on the center bearing;
a second coil winding positioned on said carrier body, said first coil winding and said second coil winding being in wireless power transfer relationship.

10. A method of producing the circuit carrier of claim 6, the method comprising:
applying said coating onto said circuit assembly surface such that said circuit member is completely encapsulated and at least partially fills said recess and completely fills said at least one retaining hole; and
drying said coating on said circuit assembly surface.

* * * * *